United States Patent
Hotta et al.

(10) Patent No.: US 7,263,967 B2
(45) Date of Patent: Sep. 4, 2007

(54) INTERNAL COMBUSTION ENGINE WITH AUXILIARY COMBUSTION CHAMBER

(75) Inventors: Isamu Hotta, Yokohama (JP); Shinichirou Nakajima, Yokohama (JP); Koichi Ashida, Yokohama (JP); Eiji Takahashi, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/441,188

(22) Filed: May 26, 2006

(65) Prior Publication Data

US 2006/0278195 A1    Dec. 14, 2006

(30) Foreign Application Priority Data

Jun. 10, 2005    (JP) ............................. 2005-171217

(51) Int. Cl.
*F02B 19/04* (2006.01)
*F02B 19/00* (2006.01)

(52) U.S. Cl. ........................ 123/275; 123/299
(58) Field of Classification Search ................ 123/285, 123/286, 287, 299, 1 A, 27 GE, 3, DIG. 12, 123/275, 274

See application file for complete search history.

(56) References Cited

U.S. PATENT DOCUMENTS

| | | | | |
|---|---|---|---|---|
| 5,007,381 A * | 4/1991 | Kakegawa et al. | ......... | 123/1 A |
| 6,463,889 B2 * | 10/2002 | Reddy | ............................ | 123/3 |
| 6,651,597 B2 * | 11/2003 | Daniel et al. | .................... | 123/3 |
| 6,739,289 B2 * | 5/2004 | Hiltner et al. | .................. | 123/3 |
| 6,793,898 B2 * | 9/2004 | Brown et al. | .......... | 422/186.21 |
| 7,028,655 B2 * | 4/2006 | Wakao et al. | .......... | 123/179.14 |
| 2003/0143442 A1 * | 7/2003 | Daniel et al. | .................. | 429/17 |
| 2003/0168024 A1 * | 9/2003 | Qian et al. | ...................... | 123/3 |
| 2003/0200939 A1 * | 10/2003 | Hiltner et al. | ................. | 123/3 |
| 2004/0045514 A1 * | 3/2004 | Qian et al. | ...................... | 123/3 |

FOREIGN PATENT DOCUMENTS

JP          2004-011517          1/2004

\* cited by examiner

*Primary Examiner*—Mahmoud Gimie
(74) *Attorney, Agent, or Firm*—Global IP Counselors, LLP

(57) ABSTRACT

An internal combustion engine includes a main combustion chamber, an auxiliary combustion chamber, a fuel reforming unit, and a control unit. The auxiliary combustion chamber is configured and arranged to communicate with the main combustion chamber. The fuel reforming unit is configured and arranged to reform a fuel to produce a reformed gaseous fuel and a reformed liquid fuel. The control unit is configured to execute control such that the reformed gaseous fuel is supplied to the auxiliary combustion chamber when a first operating condition exists and the reformed liquid fuel is supplied to the main combustion chamber when a second operating condition exists.

20 Claims, 8 Drawing Sheets

INTERNAL COMBUSTION ENGINE WITH AUXILIARY COMBUSTION CHAMBER

CROSS-REFERENCE TO RELATED APPLICATIONS

This application claims priority under 35 U.S.C. § 119 to Japanese Patent Application No. 2005-171217. The entire disclosure of Japanese Patent Application No. 2005-171217 is hereby incorporated herein by reference.

BACKGROUND OF THE INVENTION

1. Field of the Invention

The present invention relates to an internal combustion engine having an auxiliary combustion chamber.

2. Background Information

Japanese Laid-Open Patent Publication No. 2004-11517 discloses a conventional internal combustion engine having a main combustion chamber and an auxiliary combustion chamber arranged and configured to communicate with the main combustion chamber. The technology described in this reference is contrived to reform a fuel to produce a reformed gaseous fuel and a reformed liquid fuel. The reformed gaseous fuel is supplied to the auxiliary combustion chamber and the reformed liquid fuel is supplied to the main combustion chamber.

In view of the above, it will be apparent to those skilled in the art from this disclosure that there exists a need for an improved internal combustion engine with auxiliary combustion chamber. This invention addresses this need in the art as well as other needs, which will become apparent to those skilled in the art from this disclosure.

SUMMARY OF THE INVENTION

It has been discovered that, in the conventional internal combustion engine with auxiliary combustion chamber disclosed in the above mentioned reference, the combustion states that exist in the auxiliary combustion chamber and the main combustion chamber are sometimes not well suited to the operating conditions since the conventional internal combustion engine with auxiliary combustion chamber supplies the reformed liquid fuel and the reformed gaseous fuel regardless of the operating conditions.

Accordingly, one object of the present invention is to provide an internal combustion engine with an auxiliary combustion chamber configured and arranged to achieve appropriate combustion states in both the auxiliary combustion chamber and the main combustion chamber during various operating conditions.

In order to achieve the above object and other objects of the present invention, an internal combustion engine comprises a main combustion chamber, an auxiliary combustion chamber that is communicated with the main combustion chamber, a fuel supplying mechanism, and a control unit. The fuel supplying mechanism includes a fuel reforming unit configured and arranged to reform a fuel to produce a reformed gaseous fuel and a reformed liquid fuel. The control unit is configured to control the fuel supplying mechanism to selectively supply the reformed gaseous fuel to the auxiliary combustion chamber when a first operating condition exists and to selectively supply the reformed liquid fuel to the main combustion chamber when a second operating condition exists.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1-4, an internal combustion engine 1 is illustrated in accordance with a first embodiment of the present invention.

GENERAL DESCRIPTION OF CONSTITUENT FEATURES OF INTERNAL COMBUSTION ENGINE

Figure 1:
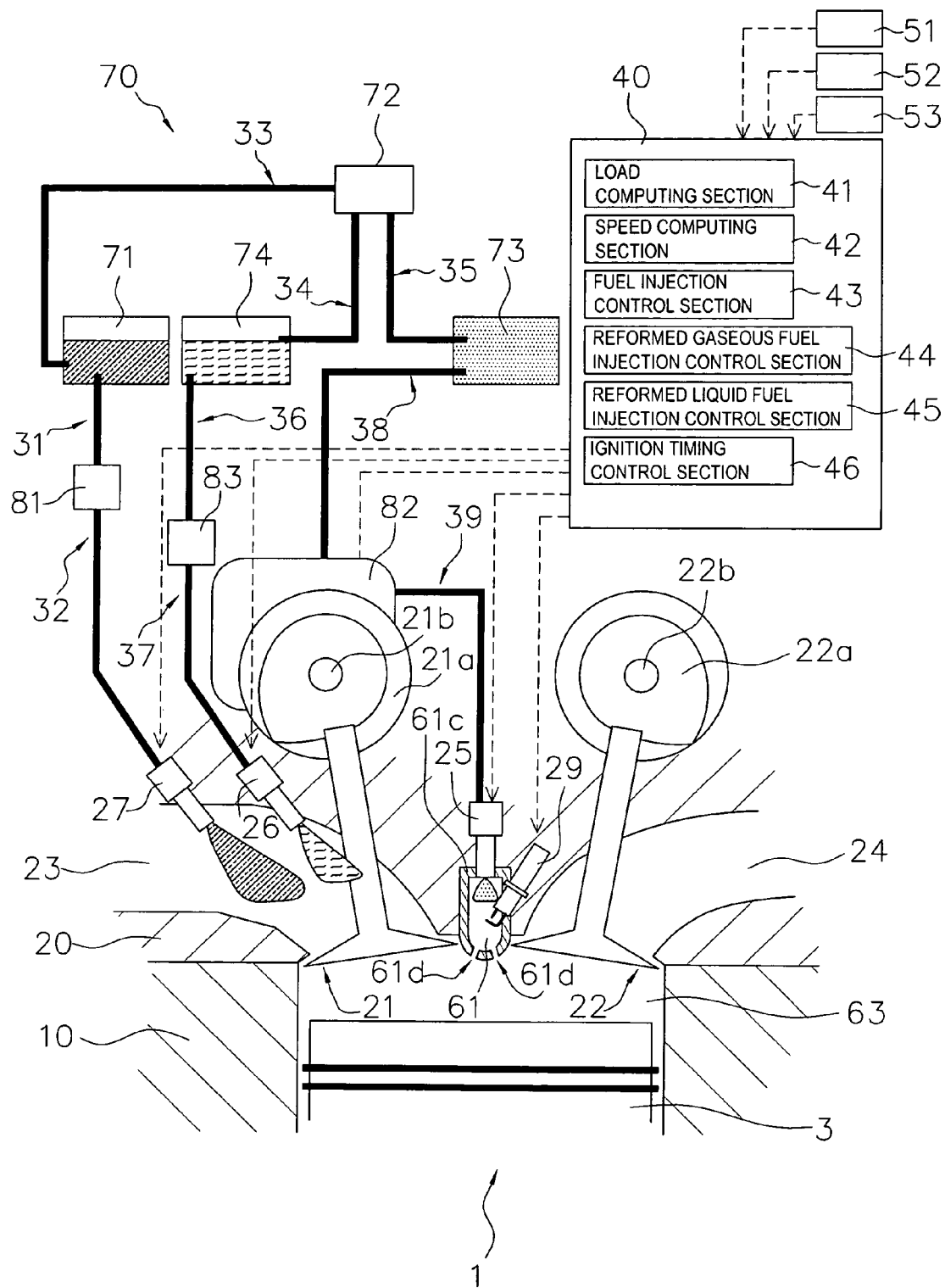
FIG. 1 is a cross sectional view of an internal combustion engine with auxiliary combustion chamber in accordance with a first embodiment of the present invention.

FIG. 1 is a cross sectional view of the internal combustion engine 1 in accordance with the first embodiment of the present invention. The internal combustion engine 1 basically comprises a plurality of main combustion chambers 63 (only one main combustion chamber 63 is shown in FIG. 1), an intake/exhaust mechanism as explained below, a fuel supplying mechanism 70, a plurality of auxiliary combustion chambers 61 (only one auxiliary combustion chamber 61 is shown in FIG. 1), a spark plug 29 disposed in each of the auxiliary combustion chambers 61, a piston 3 coupled to each of the main combustion chambers 63, and an ECU (control unit) 40.

The main combustion chamber 63 is a chamber surrounded by a cylinder head 20, a cylinder block 10, and the piston 3 as seen in FIG. 1. The cylinder head 20 has an air intake port 23 for supplying fresh air to the main combustion chamber 63 and an exhaust port 24 for discharging combusted gas and exhaust gas from the combustion chamber.

As the intake/exhaust mechanism, an intake valve 21 is provided at the downstream end of the air intake port 23 and an exhaust valve 22 is provided at the upstream end of the exhaust port 24. An intake cam 21a is fixed to an intake camshaft 21b that is arranged to be rotated simultaneously with rotation of a crankshaft (not shown). The intake cam 21a is arranged above the intake valve 21 and configured and arranged to open and close the intake valve 21. Similarly, an exhaust cam 22a is fixed to an exhaust camshaft 22b that is arranged to be rotated simultaneously with rotation of the crankshaft. The exhaust cam 22a is arranged above the exhaust valve 22 and configured and arranged to open and close the exhaust valve 22.

The auxiliary combustion chamber 61 is provided closely adjacent to the main combustion chamber 63 and surrounded by an auxiliary combustion chamber wall 61c as seen in FIG. 1. More specifically, a generally cylindrical auxiliary combustion chamber wall 61c is arranged in a space formed between the intake port 23 and the exhaust port 24 of the cylinder head 20, thereby forming the auxiliary combustion chamber 61. The bottom surface of the auxiliary combustion chamber wall 61c preferably bulges in a semispherical shape and a communication passage 61d that communicates between the main combustion chamber 63 and the auxiliary combustion chamber 61 is provided in the bottom surface of the auxiliary combustion chamber wall 61c.

The fuel supplying mechanism 70 is configured and arranged to supply fuel to the auxiliary combustion chamber 61 and the main combustion chamber 63. The fuel supplying mechanism 70 basically comprises a fuel tank 71 (fuel storage unit), a liquid phase plasma reforming device (reforming section) 72, a reformed gaseous fuel storage tank 73 (reformed gaseous fuel storage unit), a reformed liquid fuel storage tank 74 (reformed liquid fuel storage unit), a feed pump 81, a compressor 82, a feed pump 83, a first fuel pipe 31, a second fuel pipe 32, a third fuel pipe 33, a fourth fuel pipe 34, a fifth fuel pipe 35, a sixth fuel pipe 36, a seventh fuel pipe 37, an eighth fuel pipe 38, a ninth fuel pipe 39, a reformed gaseous fuel injection valve 25, a reformed liquid fuel injection valve 26 (reformed liquid fuel supplying unit), and a fuel injection valve 27 (fuel supplying unit).

The feed pump 81 is provided downstream of the fuel tank 71, and the fuel injection valve 27 is provided downstream of the feed pump 81. The fuel injection valve 27 is configured and arranged to inject fuel (e.g., gasoline) into the air intake port 23. A tip portion of the fuel injection valve 27 protrudes into the air intake port 23.

The compressor 82 is disposed downstream of the reformed gaseous fuel storage tank 73, and the reformed gaseous fuel injection valve 25 is arranged downstream of the compressor 82. The reformed gaseous fuel injection valve 25 is configured and arranged to inject reformed gaseous fuel into the auxiliary combustion chamber 61. A tip portion of the reformed gaseous fuel injection valve 25 protrudes into the auxiliary combustion chamber 61.

The feed pump 83 is arranged downstream of the reformed liquid fuel storage tank 74, and the reformed liquid fuel injection valve 26 is arranged downstream of the feed pump 83. The reformed liquid fuel injection valve 26 is configured and arranged to inject reformed liquid fuel into the air intake port 23. A tip portion of the reformed liquid fuel injection valve 26 protrudes into the air intake port 23.

The fuel supplying mechanism 70 will be discussed in more detail below with reference to FIG. 2.

The spark plug 29 is configured and arranged to ignite a mixture of fresh air and fuel in the auxiliary combustion chamber 61. The spark plug 29 is disposed to pass through the auxiliary combustion chamber wall 61c as seen in FIG. 1. A tip portion 29a of the spark plug 29 protrudes into the auxiliary combustion chamber 61.

The ECU 40 is electrically connected to the reformed gaseous fuel injection valve 25, the reformed liquid fuel injection valve 26, the fuel injection valve 27, and the spark plug 29. The ECU 40 preferably includes a microcomputer with a fuel injection control program that controls the fuel injection, the reformed liquid fuel injection and the reformed gaseous fuel injection as discussed below. The ECU 40 can also include other conventional components such as an input interface circuit, an output interface circuit, and storage devices such as a ROM (Read Only Memory) device and a RAM (Random Access Memory) device. The microcomputer of the ECU 40 is programmed to control the operations of the reformed gaseous fuel injection valve 25, the reformed liquid fuel injection valve 26, the fuel injection valve 27, and the spark plug 29. The memory circuit stores processing results and control programs such as ones for fuel injection control operation that are run by the processor circuit. The ECU 40 is operatively coupled to the reformed gaseous fuel injection valve 25, the reformed liquid fuel injection valve 26, the fuel injection valve 27, and the spark plug 29 in a conventional manner. The internal RAM of the ECU 40 stores statuses of operational flags and various control data. The ECU 40 is capable of selectively controlling any of the components of the internal combustion engine 1 in accordance with the control program. It will be apparent to those skilled in the art from this disclosure that the precise structure and algorithms for the ECU 40 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

GENERAL DESCRIPTION OF OPERATION OF INTERNAL COMBUSTION ENGINE

Figure 2:
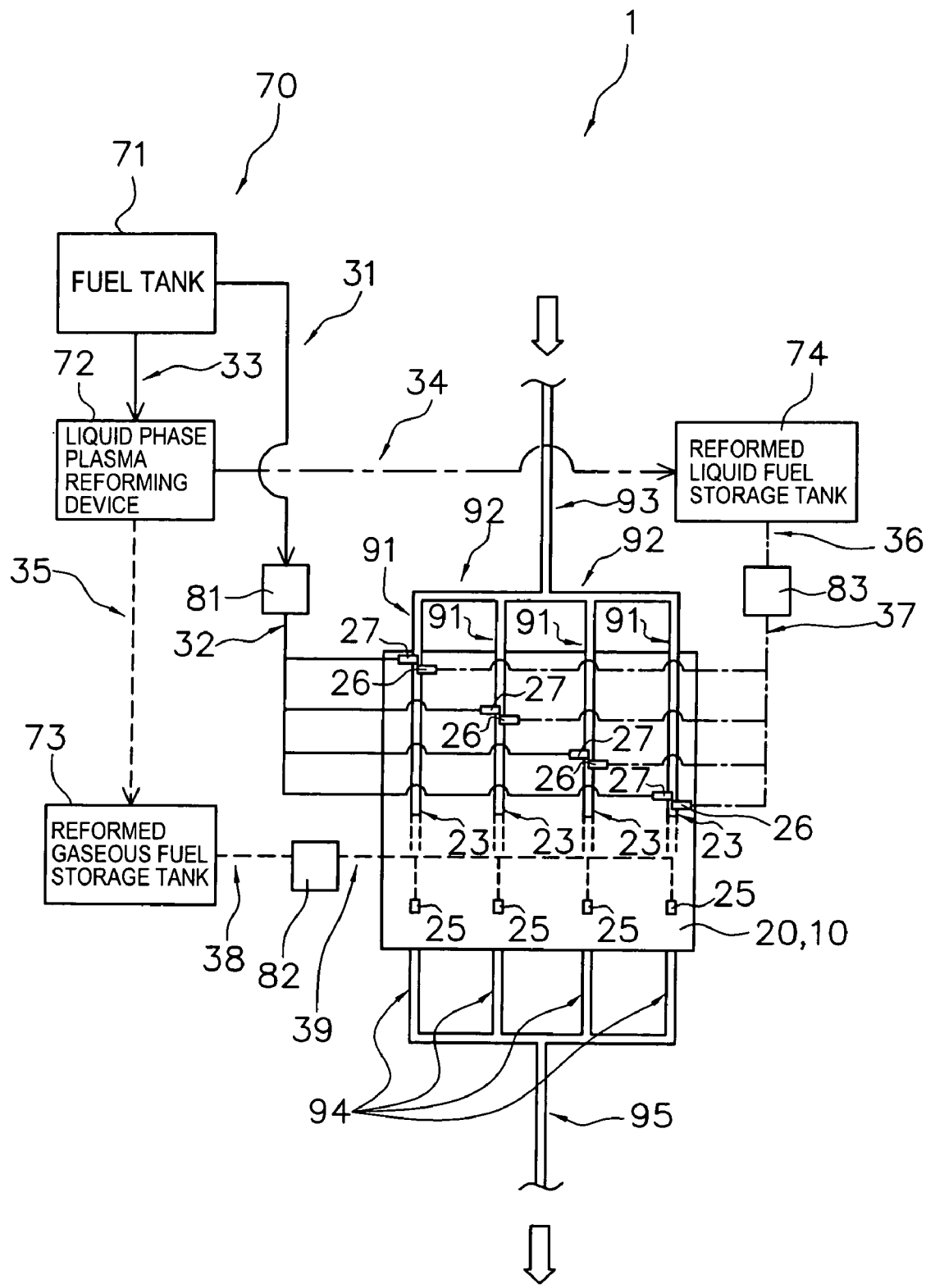
FIG. 2 is a schematic view of the internal combustion engine with auxiliary combustion chamber illustrating a fuel supplying mechanism in accordance with the first embodiment of the present invention.

FIG. 2 is a schematic view of the internal combustion engine 1 shown in FIG. 1 illustrating the fuel supplying mechanism 70 in accordance with the first embodiment of the present invention. During the intake stroke, fuel pressurized by the feed pump 81 is supplied to the fuel injection valve 27 and reformed liquid fuel pressurized by the feed pump 83 is supplied to the reformed liquid fuel injection valve 26. The ECU 40 is configured to control the fuel injection valve 27 to inject fuel into the fresh air introduced into the air intake port 23, or the reformed liquid fuel injection valve 26 to inject reformed liquid fuel into the fresh air introduced into the air intake port 23. As a result, a mixture of fuel and fresh air is created. Then, during the intake stroke, the intake valve 21 is opened by the intake cam 21a and the air-fuel mixture is drawn into the main combustion chamber 63 from the air intake port 23.

During the compression stroke, the air-fuel mixture is compressed in the main combustion chamber 63 and a portion of the air-fuel mixture enters the auxiliary combustion chamber 61 from the main combustion chamber 63 through the communication passage 61d.

When the ECU 40 determines that a first operating condition (described later) exists, reformed gaseous fuel pressurized by the compressor 82 is supplied to the reformed gaseous fuel injection valve 25. The ECU 40 is configured to control the reformed gaseous fuel injection valve 25 to inject the reformed gaseous fuel into the auxiliary combustion chamber 61. The air-fuel mixture introduced into the auxiliary combustion chamber 61 from the main combustion chamber 63 and the reformed gaseous fuel injected into the auxiliary combustion chamber 61 are mixed to form a mixture of fresh air and fuel inside the auxiliary combustion chamber 61. The reformed gaseous fuel contains gaseous hydrogen, which has a high combustion speed. Consequently, the air-fuel mixture in the auxiliary combustion chamber 61 contains hydrogen and the combustibility of the air-fuel mixture is reformed.

The ECU 40 is configured to control the spark plug 29 to ignite the air-fuel mixture inside the auxiliary combustion chamber 61 at a prescribed timing thereby causing the air-fuel mixture to combust. The resulting combustion gas (flame) that develops inside the auxiliary combustion chamber 61 moves through the communication passage 61d and into the main combustion chamber 63 in a torch-like fashion and causes the homogeneous air-fuel mixture inside the main combustion chamber 63 to combust.

During the power stroke, the air-fuel mixture combusts and generates combustion pressure, which presses the piston 3 downward.

During the exhaust stroke, the exhaust cam 22a opens the exhaust valve 22 and allows the combusted gas to be discharged from the main combustion chamber 63 to the exhaust port 24 as exhaust gas.

The ECU 40 is configured send control signals to the reformed gaseous fuel injection valve 25, the reformed liquid fuel injection valve 26, the fuel injection valve 27, and the spark plug 29 in order to accomplish various controls. The ECU 40 is configured to execute a logic sequence in order to accomplish the various controls. For example, the ECU 40 is configured to execute a prescribed logic sequence by using an electric circuit, software, or both.

More specifically, with the internal combustion engine 1, the ECU 40 is configured to execute control to supply reformed gaseous fuel to the auxiliary combustion chamber 61 when a first operating condition exists. Thus, the decline in combustion speed in the auxiliary combustion chamber 61 can be suppressed when, for example, the operating conditions of the internal combustion engine 1 are such that the air-fuel ratio in the auxiliary combustion chamber 61 is controlled to a leaner value. Consequently, a suitable combustion speed can be achieved in the auxiliary combustion chamber 61 during various operating conditions.

On the other hand, the ECU 40 is configured to execute control to supply reformed liquid fuel to the main combustion chamber 63 when the second operating condition exists. Thus, the occurrence of knocking in the main combustion chamber 63 can be reduced when, for example, the operating conditions of the internal combustion engine 1 are such that knocking can occur easily in the main combustion chamber 63. Consequently, a suitable ignitability can be achieved in the main combustion chamber 63 during various operating conditions.

Accordingly, with the internal combustion engine 1 in accordance with the present invention, a suitable combustion speed can be achieved in the auxiliary combustion chamber 61 and a suitable ignitability can be achieved in the main combustion chamber 63 during various operating conditions. As a result, appropriate combustion states can be achieved in both the auxiliary combustion chamber 61 and the main combustion chamber 63 during various operating conditions.

DETAILED DESCRIPTION OF CONSTITUENT FEATURES OF FUEL SUPPLYING MECHANISM

Still referring to FIG. 2, the fuel supplying mechanism 70 will be discussed in more detail. As seen in FIG. 2, the fuel tank 71 is connected to the feed pump 81 by the first fuel pipe 31. The feed pump 81 is connected to the fuel injection valves 27 by the second fuel pipe 32. The tip portion of each of the fuel injection valves 27 protrudes into the intake port 23 as seen in FIG. 1. In this embodiment, one intake port 23 is provided in the cylinder head 20 for each cylinder (there are four cylinders in the example shown in FIG. 2) and, thus, one fuel injection valve 27 is provided for each cylinder. Therefore, the second fuel pipe 32 is branched into a number of branch pipes corresponding to the number of cylinders with each branch pipe connecting to corresponding one of the fuel injection valves 27 as shown in FIG. 2.

The fuel tank 71 is connected to the liquid phase plasma reforming device 72 by the third fuel pipe 33. The liquid phase plasma reforming device 72 is connected to the reformed liquid fuel storage tank 74 by the fourth fuel pipe 34 and to the reformed gaseous fuel storage tank 73 by the fifth fuel pipe 35.

The reformed liquid fuel storage tank 74 is connected to the feed pump 83 by the sixth fuel pipe 36. The feed pump 83 is connected to the reformed liquid fuel injection valves 26 by the seventh fuel pipe 37. The tip of the reformed liquid fuel injection valve 26 protrudes into the intake port 23. Since, in this embodiment, one intake port 23 is provided in the cylinder head 20 for each cylinder (there are four cylinders in the example shown in FIG. 2), one reformed liquid fuel injection valve 26 is provided for each cylinder. Therefore, the seventh fuel pipe 37 is branched into a number of branch pipes corresponding to the number of cylinders with each branch pipe connecting to corresponding one of the reformed liquid fuel injection valves 26.

The reformed gaseous fuel storage tank 73 is connected to the compressor 82 by the eighth fuel pipe 38. The compressor 82 is connected to the reformed gaseous fuel injection valve 25 by the ninth fuel pipe 39. The tip portion of each of the reformed gaseous fuel injection valves 25 protrudes into the auxiliary combustion chamber 61 as seen in FIG. 1. Since one auxiliary combustion chamber 61 is provided in the cylinder head 20 for each cylinder (there are four cylinders in the example shown in FIG. 2), one reformed gaseous fuel injection valve 25 is provided for each cylinder. Therefore, the ninth fuel pipe 39 is branched into a number of branch pipes corresponding to the number of cylinders with each branch pipe connecting to corresponding one of the reformed gaseous fuel injection valves 25.

The fresh air is drawn into a first air intake pipe 93 which is connected to a collector 92. An intake manifold with a number of runners 91 corresponding to the number of cylinders are connected between the collector 92 and the cylinder head 20, i.e., one runner 91 is connected to each air intake port 23. Similarly, an exhaust manifold with a number of exhaust runners 94 corresponding to the number of cylinders are connected to corresponding one of the exhaust ports 24 (FIG. 1), and the exhaust runners 94 merge together and connect to a first exhaust pipe 95.

DETAILED DESCRIPTION OF OOPERATION OF FUEL SUPPLY MECHANISM

A portion of the fuel stored in the fuel tank 71 is supplied to the feed pump 81 through the first fuel pipe 31 and pressured by the feed pump 81. The fuel pressured by the feed pump 81 is supplied to the fuel injection valves 27 through the second fuel pipe 32. Each of the fuel injection valves 27 injects fuel into the air intake port 23 at a prescribed timing in accordance with a control signal issued from the ECU 40.

A separate portion of the fuel stored in the fuel tank 71 is supplied to the liquid phase plasma reforming device 72 through the third fuel pipe 33. The liquid phase plasma reforming device 72 is configured and arranged to reform the fuel by executing a plasma discharge inside the fuel (e.g., liquid gasoline). The liquid phase plasma reforming device 72 thereby produces reformed gaseous fuel and reformed liquid fuel. The reformed gaseous fuel contains hydrogen as a main component, and thus, has an improved combustibility. The reformed liquid fuel has a higher octane value than the unreformed fuel prior to the reformation in the liquid phase plasma reforming device 72, and thus, has an improved knock resistance. In FIG. 2, the flow of the unreformed fuel is indicated with a solid line.

The reformed gaseous fuel produced by the liquid phase plasma reforming device 72 is supplied to the reformed gaseous fuel storage tank 73 through the fifth fuel pipe 35. The reformed gaseous fuel storage tank 73 stores the reformed gaseous fuel. The reformed gaseous fuel stored in the reformed gaseous fuel storage tank 73 is supplied to the compressor 82 through the eighth fuel pipe 38 and pressurized by the compressor 82. The reformed gaseous fuel pressurized by the compressor 82 is supplied to each of the reformed gaseous fuel injection valves 25 through the ninth fuel pipe 39. Each of the reformed gaseous fuel injection valves 25 injects reformed gaseous fuel into the auxiliary combustion chamber 61 at a prescribed timing in accordance with a control signal issued from the ECU 40. In FIG. 2, the flow of the reformed gaseous fuel is indicated with a broken (dotted) line.

Meanwhile, the reformed liquid fuel produced by the liquid phase plasma reforming device 72 is supplied to the reformed liquid fuel storage tank 74 through the fourth fuel pipe 34. The reformed liquid fuel storage tank 74 stores the reformed liquid fuel. The reformed liquid fuel stored in the reformed liquid fuel storage tank 74 is supplied to the feed pump 83 through the sixth fuel pipe 36 and pressurized by the feed pump 83. The reformed liquid fuel pressurized by the feed pump 83 is supplied to each of the reformed liquid fuel injection valves 26 through the seventh fuel pipe 37. Each of the reformed liquid fuel injection valves 26 injects reformed liquid fuel into the air intake port 23 at a prescribed timing in accordance with a control signal issued from the ECU 40. In FIG. 2, the flow of the reformed liquid fuel is indicated with a single-dotted chain line.

DETAILED DESCRIPTION OF CONSTITUENT FEATURES OF ECU

As seen in FIG. 1, the ECU 40 basically comprises a load computing unit 41, a speed computing section 42, a fuel injection control section 43, a reformed gaseous fuel injection control section 44, a reformed liquid fuel injection control section 45, an ignition timing control section 46, a memory unit (not shown), and an input/output interface (not shown). The load computing unit 41, the speed computing section 42, the fuel injection control section 43, the reformed gaseous fuel injection control section 44, the reformed liquid fuel injection control section 45, and the ignition timing control section 46 are preferably realized with the CPU or the like. The memory unit is the ROM, the RAM, or the like in which programs and map information (FIGS. 3 and 4) are stored. The input/output interface is configured and arranged to act as an interface for receiving signals from external sources and sending signals to external destinations.

In addition to executing logic in order to accomplish various controls for the internal combustion engine 1, the ECU 40 is configured to execute logic sequences for controlling the reformed gaseous fuel injection valve 25, the reformed liquid fuel injection valve 26, and the fuel injection valve 27 as explained in more detail below.

DETAILED DESCRIPTION OF OPERATION OF ECU

As shown in FIG. 1, the ECU 40 is connected to a crank angle sensor 51, a coolant sensor 52 and an accelerator position signal 53. The ECU 40 is configured to receive such detection signals as a crank angle signal from the crank angle sensor 51, a coolant temperature signal from the coolant sensor 52, an accelerator position signal from the accelerator position signal 53 through the input/output interface. More specifically, the load computing unit 41 and the speed computing section 42 are configured to receive those detection signals from the input/output interface. The load computing unit 41 is configured to compute the engine load based on the detection signals and the speed computing section 42 is configured to compute the engine speed based on the detection signals.

The fuel injection control section 43 is configured to receive engine load information from the load computing unit 41 and engine speed information from the speed computing section 42. The fuel injection control section 43 is configured to access the memory unit and to retrieve map information (see FIG. 4) from the memory unit. The fuel injection control section 43 is configured to generate a fuel injection quantity control signal based on the engine load information, the engine speed information, and the map information. Based on the fuel injection quantity control signal, each of the fuel injection valves 27 is controlled to inject a prescribed amount of fuel into the air intake port 23.

The reformed gaseous fuel injection control section 44 is configured to receive engine load information from the load computing unit 41 and engine speed information from the speed computing section 42. The reformed gaseous fuel injection control section 44 is configured to access the memory unit and to retrieve map information (see FIG. 3) from the memory unit. The reformed gaseous fuel injection control section 44 is configured to generate a reformed gaseous fuel injection quantity control signal based on the engine load information, the engine speed information, and the map information. Based on the reformed gaseous fuel injection quantity control signal, each of the reformed gaseous fuel injection valves 25 is controlled to inject a prescribed amount of reformed gaseous fuel into the auxiliary combustion chamber 61.

The reformed liquid fuel injection control section 45 is configured to receive engine load information from the load computing unit 41 and engine speed information from the speed computing section 42. The reformed liquid fuel injection control section 45 is configured to access the memory unit and to retrieve map information (see FIG. 4) from the memory unit. The reformed liquid fuel injection control section 45 is configured to generate a reformed liquid fuel injection quantity control signal based on the engine load information, the engine speed information, and the map information. Based on the reformed liquid fuel injection quantity control signal, each the reformed liquid fuel injection valves 26 is controlled to inject a prescribed amount of reformed liquid fuel into the air intake port 23.

The ignition timing control section 46 is configured to receive engine load information from the load computing unit 41 and engine speed information from the speed computing section 42 and to generate an ignition timing control signal based on the engine load information and the engine speed information. Based on the ignition timing control signal, each of the spark plugs 29 is controlled to produce a spark at a prescribed timing.

CONTROL OF INTERNAL COMBUSTION ENGINE

Figure 3:
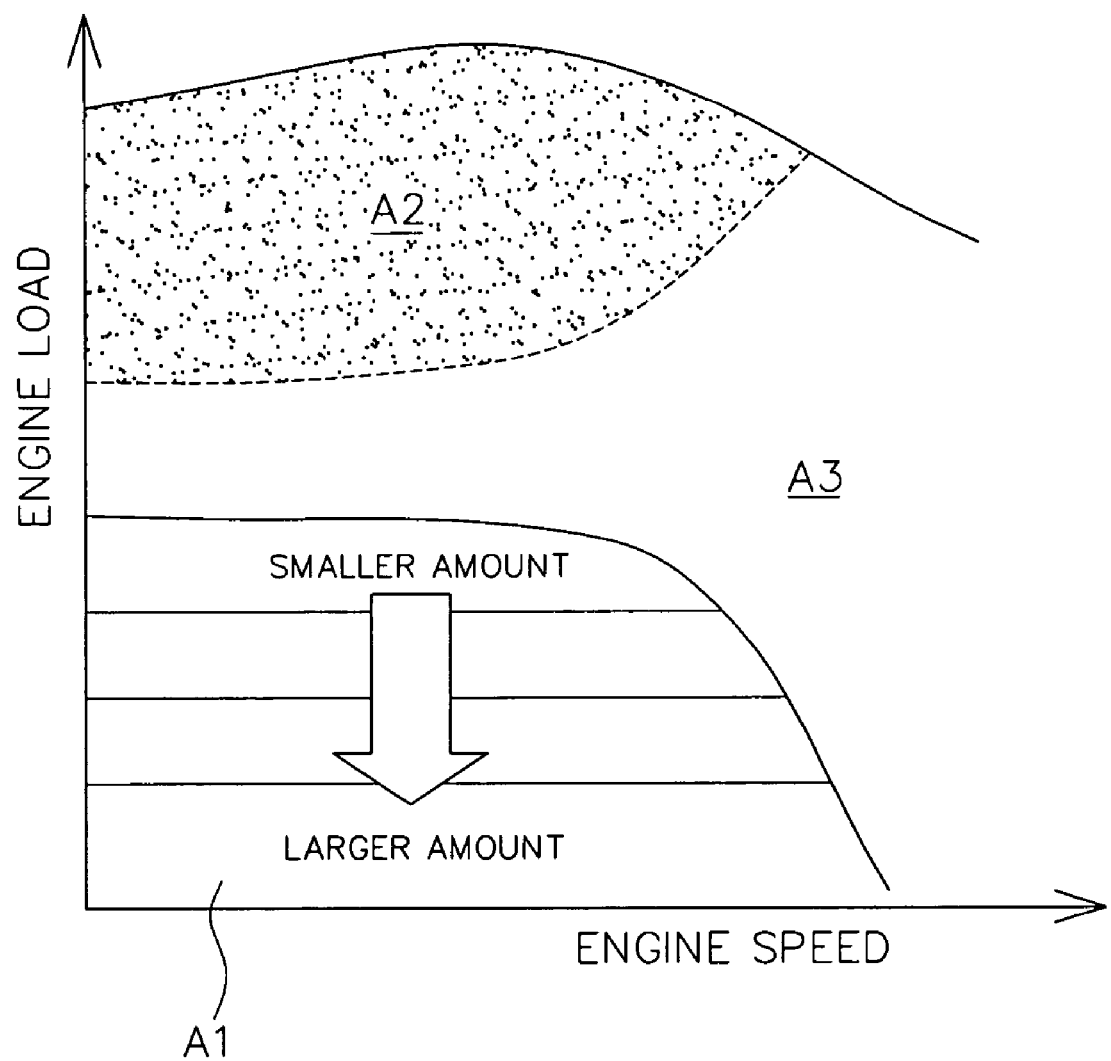
FIG. 3 is a simplified diagrammatic view illustrating first map information used in reformed liquid fuel injection control in accordance with the first embodiment of the present invention.
Figure 4:
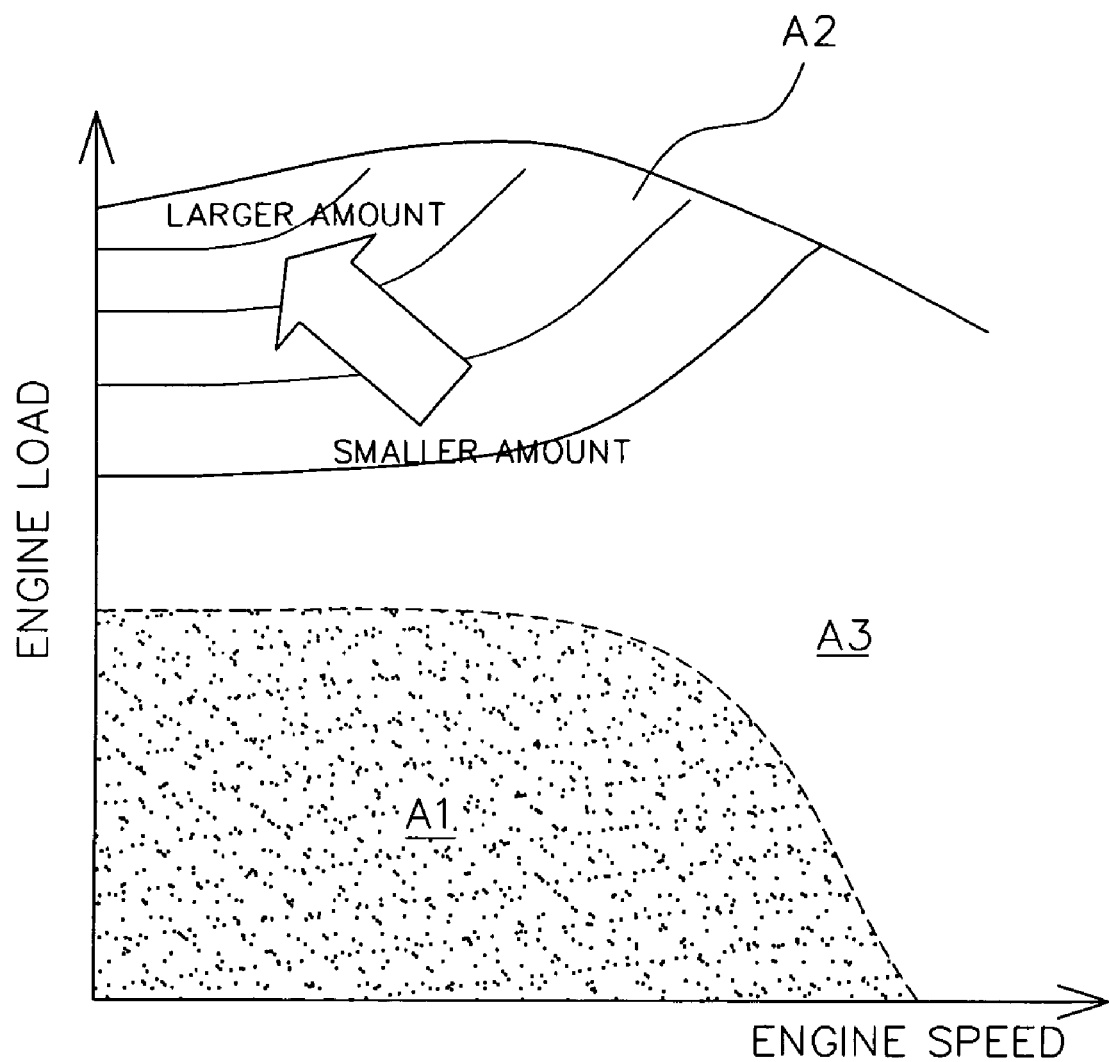
FIG. 4 is a simplified diagrammatic view illustrating second map information used in reformed gaseous fuel injection control in accordance with the first embodiment of the present invention.

The control of the internal combustion engine 1 will now be described with reference to FIGS. 3 and 4. The map information used by the fuel injection control section 43 and the reformed liquid fuel injection control section 45 of the ECU 40 is shown in FIG. 4 while the map information used by the reformed gaseous fuel injection control section 44 is shown in FIG. 3. The maps shown in FIGS. 3 and 4 indicate the relationship between the engine control regions with respect to the engine load and engine speed. More specifically, the engine control region is divided into a first control region A1, a second control region A2, and a third control region A3. The first control region A1 is a region of comparatively low speed and low load. In the first control region A1, the internal combustion engine 1 is controlled such that the air-fuel ratio in the main combustion chamber 63 is leaner than the stoichiometric air-fuel ratio. The operating condition in first control region A1 is referred as a first operating condition. The second control region A2 is a region of comparatively low speed and high load. In the second control region A2, the conditions inside the main combustion chamber 63 are such that knocking can occur more easily. The operating condition in the second control region A2 is referred as a second operating condition. The third control region A3 encompasses all control regions outside the first control region A1 and the second control region A2.

The upper limit of the first control region A1 (the boundary between the first control region A1 and the third control region A3) is preferably set such that the combustion speed would not become excessively fast thereby causing the combustion noise to be excessively loud when the combustion is executed with reformed gaseous fuel being supplied to the auxiliary combustion chamber 61. The lower limit of the second control region A2 (the boundary between the second control region A2 and the third control region A3) is preferably set such that the knocking would not occur when the combustion is executed with reformed liquid fuel being supplied to the main combustion chamber 63. Moreover, if the control, in which the reformed liquid fuel is supplied to the main combustion chamber 63, was executed in regions having a lower engine load than the engine load of the second control region A2, the liquid phase plasma reforming device 72 would be required to be larger in order to produce a larger amount of the reformed liquid fuel.

The map illustrated in FIG. 3 indicates the relationship between the reformed gaseous fuel injection quantity and the engine load and engine speed and the map illustrated in FIG. 4 indicates the relationship between the reformed liquid fuel injection quantity and the engine load and engine speed.

DESCRIPTION OF CONTROL EXECUTED IN FIRST CONTROL REGION A1

When the ECU 40 determines that the internal combustion engine 1 is operating in the first control region A1, i.e., that the first operating condition exists, the ECU 40 is configured to execute control such that reformed gaseous fuel is supplied to the auxiliary combustion chamber 61. In other words, the ECU 40 is configured to generate the reformed gaseous fuel injection quantity control signal based on the engine load information, the engine speed information, and the map information, and to control each of the reformed gaseous fuel injection valves 25 so that each of the reformed gaseous fuel injection valves 25 injects a prescribed amount of reformed gaseous fuel into the auxiliary combustion chamber 61 at a prescribed timing based on the reformed gaseous fuel injection quantity control signal. More specifically, when the first operating condition exists, the ECU 40 is configured to control the reformed gaseous fuel injection quantity such that a larger quantity of reformed gaseous fuel is injected into the auxiliary combustion chamber 61 when the engine load is small than when the engine load is large (i.e., the smaller the engine load is, the larger an amount of the reformed gaseous fuel supplied to the auxiliary combustion chamber 61 becomes) (see FIG. 3). Consequently, when the engine load is small, the decline in combustion speed in the auxiliary combustion chamber 61 is suppressed, and thus, the decline in strength of the flame that propagates from the auxiliary combustion chamber 61 to the main combustion chamber 63 through the communication chamber 61d can be suppressed. As a result, since the lean mixture of fresh air and fuel in the main combustion chamber 63 is ignited, the lean limit of the main combustion chamber 63 can be expanded.

Additionally, when the ECU 40 determines that the internal combustion engine 1 is operating in the first control region A1, i.e., that the first operating condition exists, the ECU 40 is configured to execute control such that a second injection control state is achieved. In the second injection control, the ECU 40 is configured to control each of the fuel injection valves 27 to supply unreformed fuel to the main combustion chamber 63 by injecting the unreformed fuel into the intake port 23. More specifically, the fuel injection valve 27 injects a prescribed quantity of unreformed fuel into the air intake port 23 at a prescribed timing based on the fuel injection quantity control signal. Meanwhile, based on the reformed liquid fuel injection quantity control signal issued by the ECU 40, each of the reformed liquid fuel injection valves 26 is controlled not to inject reformed liquid fuel into the air intake port 23. As a result, the tendency for the ignitability of the air-fuel mixture in the main combustion chamber 63 to be suppressed more than necessary is reduced, and thus, the discharge of unburned air-fuel mixture from the main combustion chamber 63 can be reduced.

DESCRIPTION OF CONTROL EXECUTED IN SECOND CONTROL REGION A2

When the ECU 40 determines that the engine is operating in the second control region A2, i.e., that the second operating condition exists, the ECU 40 is configured to execute control such that reformed gaseous fuel is not supplied to the auxiliary combustion chamber 61. Thus, based on the reformed gaseous fuel injection quantity control signal issued by the ECU 40, each of the reformed gaseous fuel injection valves 25 is controlled not to inject reformed gaseous fuel into the auxiliary combustion chamber 61.

Consequently, the tendency of the combustion speed in the auxiliary combustion chamber 61 to increase excessively is reduced, and thus, the flame that propagates from the auxiliary combustion chamber 61 to the main combustion chamber 63 through the communication chamber 61d is substantially prevented from becoming excessively strong. As a result, since the tendency of the combustion speed in the main combustion chamber 63 to be excessively increased is reduced, the occurrence of combustion noise in the main combustion chamber 63 can be reduced.

Additionally, when the ECU 40 determines that the engine is operating in the second control region A2, i.e., that the second operating condition exists, the ECU 40 is configured to execute control such that a first injection control state is achieved. In the first injection control state, the ECU 40 is configured to control each of the reformed liquid fuel injection valves 26 to supply reformed liquid fuel to the main combustion chamber 63 by injecting the reformed liquid fuel into the intake port 23. Moreover, based on the reformed liquid fuel injection quantity control signal issued by the ECU 40, each of the reformed liquid fuel injection valves 26 is controlled to inject a prescribed quantity of reformed liquid fuel into the air intake port 23 at a prescribed timing. More specifically, when the second operating condition exists, the ECU 40 is configured to control the reformed liquid fuel injection quantity such that a larger quantity of reformed liquid fuel is supplied to the main combustion chamber 63 when the engine speed is low than when the engine speed is high (i.e., the lower the engine speed is, the larger an amount of the reformed liquid fuel supplied to the main combustion chamber 63 becomes) (see FIG. 4). As a result, the occurrence of knocking in the main combustion chamber 63 is reduced when the engine speed is low. Also, when the second operating condition exists, the ECU 40 is configured to control the reformed liquid fuel injection quantity such that a larger quantity of reformed liquid fuel is supplied to the main combustion chamber 63 when the engine load is large than when the engine load is small (i.e., the larger the engine load is, the larger an amount of the reformed liquid fuel supplied to the main combustion chamber 63 becomes) (see FIG. 4). As a result, the occurrence of knocking in the main combustion chamber 63 is reduced when the engine load is large.

DESCRIPTION OF CONTROL EXECUTED IN THIRD CONTROL REGION A3

When the ECU 40 determines that the internal combustion engine 1 is operating in the third control region A3, the ECU 40 is configured to execute control such that reformed gaseous fuel is not supplied to the auxiliary combustion chamber 61. In other words, based on the reformed gaseous fuel injection quantity control signal issued by the ECU 40, each of the reformed gaseous fuel injection valves 25 is controlled not to inject reformed gaseous fuel into the auxiliary combustion chamber 61. As a result, the tendency of the combustion speed in the auxiliary combustion chamber 61 to increase excessively is reduced.

Additionally, when the ECU 40 determines that the internal combustion engine 1 is operating in the third control region A3, the ECU 40 is configured to execute control such that the second injection control state is achieved. As mentioned above, in the second injection control state, the ECU 40 is configured to control each of the fuel injection valves 27 to supply unreformed fuel to the main combustion chamber 63 by injecting the unreformed fuel into the intake port 23. More specifically, each of the fuel injection valves 27 is configured to inject a prescribed quantity of unreformed fuel into the air intake port 23 at a prescribed timing based on the fuel injection quantity control signal. Also, based on the reformed liquid fuel injection quantity control signal issued by the ECU 40, each of the reformed liquid fuel injection valves 26 is controlled not to inject reformed liquid fuel into the air intake port 23. As a result, the tendency for the ignitability of the air-fuel mixture in the main combustion chamber 63 to be suppressed more than necessary is reduced.

Accordingly, with the internal combustion engine 1 of the first embodiment of the present invention, the ECU 40 is configured to execute control to supply reformed gaseous fuel to the auxiliary combustion chamber 61 when the first operating condition exists. Thus, when the operating conditions are such that the air-fuel ratio of the auxiliary combustion chamber 61 is controlled to a lean value, the decline in combustion speed in the auxiliary combustion chamber 61 is suppressed. Consequently, a suitable combustion speed can be achieved in the auxiliary combustion chamber 61 during various operating conditions. Also, when the second operating condition exists, the ECU 40 is configured to execute control to supply reformed liquid fuel to the main combustion chamber 63. Thus, the occurrence of knocking in the main combustion chamber 63 can be reduced when, for example, the operating conditions are such that knocking can occur easily in the main combustion chamber 63. Consequently, a suitable ignitability can be achieved in the main combustion chamber during various operating conditions.

In accordance with the control of the present invention, since a suitable combustion speed can be achieved in the auxiliary combustion chamber 61 and a suitable ignitability can be achieved in the main combustion chamber 63 during various operating conditions, suitable combustion states are achieved in the auxiliary combustion chamber 61 and the main combustion chamber 63 during various operating conditions.

Moreover, the ECU 40 is configured to determine the first operating condition exists when the internal combustion engine 1 is operating in a low-load and low-speed operating region (the first control region A1). Also, the liquid phase plasma reforming device 72 is configured to produce the reformed gaseous fuel such that the reformed gaseous fuel contains hydrogen as a main component. By supplying the reformed gaseous fuel to the auxiliary combustion chamber 61 when the first operating condition exists, the combustion speed in the auxiliary combustion chamber can be substantially prevented from declining. Additionally, since the reformed gaseous fuel is not supplied to the auxiliary combustion chamber 61 when an operating condition other than the first operating condition exists, the tendency of the combustion speed in the auxiliary combustion chamber 61 to increase excessively can be reduced. As a result, a suitable combustion speed is achieved in the auxiliary combustion chamber 61 during a variety of operating conditions.

Furthermore, when the first operating condition exists, the ECU 40 is configured to control the reformed gaseous fuel injection quantity such that the quantity of reformed gaseous fuel supplied to the auxiliary combustion chamber 61 is larger when the engine load is small than when the engine load is large. Consequently, the combustion speed in the auxiliary combustion chamber 61 is substantially prevented from declining when the engine load is small. As a result, a suitable combustion speed is achieved in the auxiliary combustion chamber 61 during a variety of operating conditions.

The reformed gaseous fuel storage tank 73 stores reformed gaseous fuel produced by the liquid phase plasma reforming device 72. Consequently, it is easier to supply reformed gaseous fuel to the auxiliary combustion chamber 61 when the first operating condition exists and to withhold the supply of reformed gaseous fuel to the auxiliary combustion chamber 61 when an operating condition other than the first operating condition exists. As a result, a suitable combustion speed is achieved in the auxiliary combustion chamber 61 during a variety of operating conditions.

The ECU 40 is configured to determine the second operating condition exists when the internal combustion engine 1 is operating in a high-load and low-speed operating region (the second control region A2). Also, the liquid phase plasma reforming device 72 is configured to produce the reformed gaseous fuel such that the reformed liquid fuel has a high octane value. By supplying the reformed liquid fuel to the main combustion chamber 63 when the second operating condition exists, the occurrence of knocking in the main combustion chamber 63 is reduced. Additionally, since the reformed liquid fuel is not supplied to the main combustion chamber 63 when an operating condition other than the second operating condition exists, the tendency for the ignitability of the air-fuel mixture in the main combustion chamber 63 to be suppressed more than necessary is reduced. As a result, a suitable ignitability is achieved in the main combustion chamber 63 during a variety of operating conditions.

When the second operating condition exists, the ECU 40 is configured to control the reformed liquid fuel injection quantity such that the quantity of reformed liquid fuel supplied to the main combustion chamber 63 is larger when the engine speed is low than when the engine speed is high. Consequently, the occurrence of knocking in the main combustion chamber 63 is reduced when the engine load is large. As a result, the occurrence of knocking in the main combustion chamber 63 is suppressed during a variety of operating conditions.

The reformed liquid fuel storage tank 74 stores reformed liquid fuel produced by the liquid phase plasma reforming device 72. Consequently, it is easier to supply reformed liquid fuel to the main combustion chamber 63 when the second operating condition exists and to withhold the supply of reformed liquid fuel to the main combustion chamber 63 when an operating condition other than the second operating condition exists. As a result, a suitable ignitability is achieved in the main combustion chamber 63 during a variety of operating conditions.

The reformed liquid fuel injection valve 26 is configured to supply reformed liquid fuel stored in the reformed liquid fuel storage tank 74 to the main combustion chamber 63 by injecting the reformed liquid fuel into the air intake port 23. The fuel injection valve 27 is configured to supply unreformed fuel stored in the fuel tank 71 to the main combustion chamber 63 by injecting the unreformed fuel into the air intake port 23. Consequently, it is easier to supply reformed liquid fuel to the main combustion chamber 63 when the second operating condition exists and to supply of unreformed fuel to the main combustion chamber 63 when an operating condition other than the second operating condition exists.

The ECU 40 is configured to switch between the first injection control state and the second injection control state. More specifically, the ECU 40 is configured to execute control such that the first injection control state is achieved when the ECU 40 determines that the internal combustion engine 1 is operating in the second control region A2, i.e., when the second operating condition exists. On the other hand, the ECU 40 is configured to execute control such that the second injection control state is achieved when the ECU 40 determines that the internal combustion engine 1 is operating in the first control region A1 or the third control region A3. Therefore, reformed liquid fuel is supplied to the main combustion chamber 63 when the second operating condition exists and unreformed fuel is supplied to the main combustion chamber 63 when an operating condition other than the second operating condition exists.

The liquid phase plasma reforming device 72 is configured and arranged to reform the fuel by performing a plasma discharge in the fuel. Consequently, the system used to reform the fuel has excellent starting performance and can be manufactured inexpensively.

Instead of using the feed pump 81 to pressurize a portion of the fuel stored in the fuel tank 71, it is also acceptable to use a pump driven by the intake cam 21a or the exhaust cam 22a or to use any other device that accomplishes the same function as the feed pump 81.

Instead of using the compressor 82 to pressurize the reformed gaseous fuel stored in the reformed gaseous fuel storage tank 73, it is also acceptable to use an electric powered pump or any other device that accomplishes the same function as the compressor 82.

Instead of using the feed pump 83 to pressurize the reformed liquid fuel stored in the reformed liquid fuel storage tank 74, it is also acceptable to use a pump driven by the intake cam 21a or the exhaust cam 22a or to use any other device that accomplishes the same function as the feed pump 83.

Second Embodiment

Figure 5:
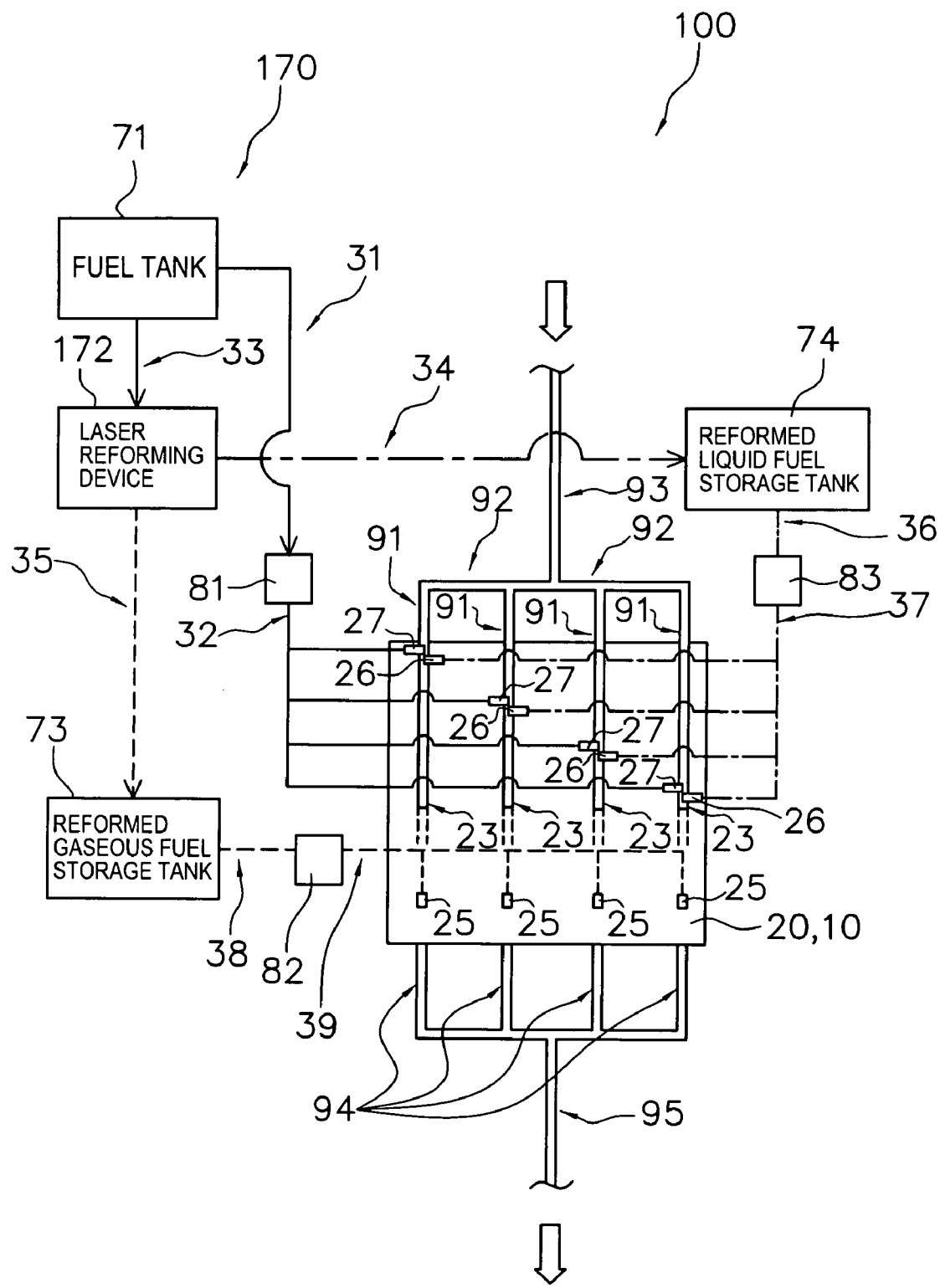
FIG. 5 is a schematic view of an internal combustion engine with auxiliary combustion chamber illustrating a fuel supplying mechanism in accordance with a second embodiment of the present invention.

Referring now to FIG. 5, an internal combustion engine 100 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The internal combustion engine 100 of this embodiment is basically the same as the internal combustion engine 1 of the first embodiment, except that a fuel supplying mechanism 170 is used in the second embodiment instead of the fuel supplying mechanism 70 of the first embodiment. More specifically, the fuel supplying mechanism 170 of the second embodiment differs from the fuel supplying mechanism 70 of the first embodiment in that a laser reforming device (fuel reforming unit) 172 is used instead of the liquid phase plasma reforming device 72. Accordingly, the structure of the internal combustion engine 100 of the second embodiment is basically identical to the structure of the internal combustion engine 1 illustrated in FIG. 1, except that the liquid phase plasma reforming device 72 in FIG. 1 is substituted with the laser reforming device 172 in the second embodiment.

FIG. 5 is a schematic view of the internal combustion engine 100 illustrating the fuel supplying mechanism 170 in accordance with the second embodiment of the present invention.

A portion of the fuel stored in the fuel tank 71 is supplied to the laser reforming device 172 through the third fuel pipe 33. The laser reforming device 172 is configured and arranged to reform the fuel by shining laser light into the fuel. The laser reforming device 172 thereby produces reformed gaseous fuel and reformed liquid fuel. The reformed gaseous fuel contains hydrogen as a main component, and thus, has an improved combustibility. Also, the reformed liquid fuel has a higher octane value than the unreformed fuel prior to the reformation in the laser reforming device 172, and thus, has an improved knock resistance. In FIG. 5, the flow of the unreformed fuel is indicated with a solid line.

The reformed gaseous fuel produced by the laser reforming device 172 is supplied to the reformed gaseous fuel storage tank 73 through the fifth fuel pipe 35. On the other hand, the reformed liquid fuel produced by the laser reforming device 172 is supplied to the reformed liquid fuel storage tank 74 through the fourth fuel pipe 34. In FIG. 5, the flow of the reformed gaseous fuel is indicated with a broken (dotted) line and the flow of the reformed liquid fuel is indicated with a single-dotted chain line.

The fuel injection control executed in the ECU 40 (FIG. 1) in the internal combustion engine 100 of the second embodiment is basically identical to the fuel injection control executed in the internal combustion engine 1 of the first embodiment as explained above. More specifically, the ECU 40 is configured to control the fuel supplying mechanism 170 such that the reformed gaseous fuel is supplied to the auxiliary combustion chamber 61 (FIG. 1) when the first operating condition exists (i.e., when the internal combustion engine 100 is operating in the first control region A1 in FIGS. 3 and 4) and the reformed liquid fuel is supplied to the main combustion chamber 63 (FIG. 1) when a second operating condition exists (i.e., when the internal combustion engine 100 is operating in the second control region A2 in FIGS. 3 and 4).

Thus, similarly to the first embodiment, a suitable combustion speed can be achieved in the auxiliary combustion chamber 61 and a suitable ignitability can be achieved in the main combustion chamber 63 during various operating conditions. As a result, with the internal combustion engine 100, too, appropriate combustion states can be achieved in both the auxiliary combustion chamber 61 and the main combustion chamber 63 during various operating conditions.

Additionally, in the second embodiment, the laser reforming device 172 is configured and arranged to reform the fuel by performing shining laser light in the fuel. Consequently, the system used to reform the fuel has excellent starting performance and offers a high degree of freedom regarding the layout of the system.

Third Embodiment

Figure 6:
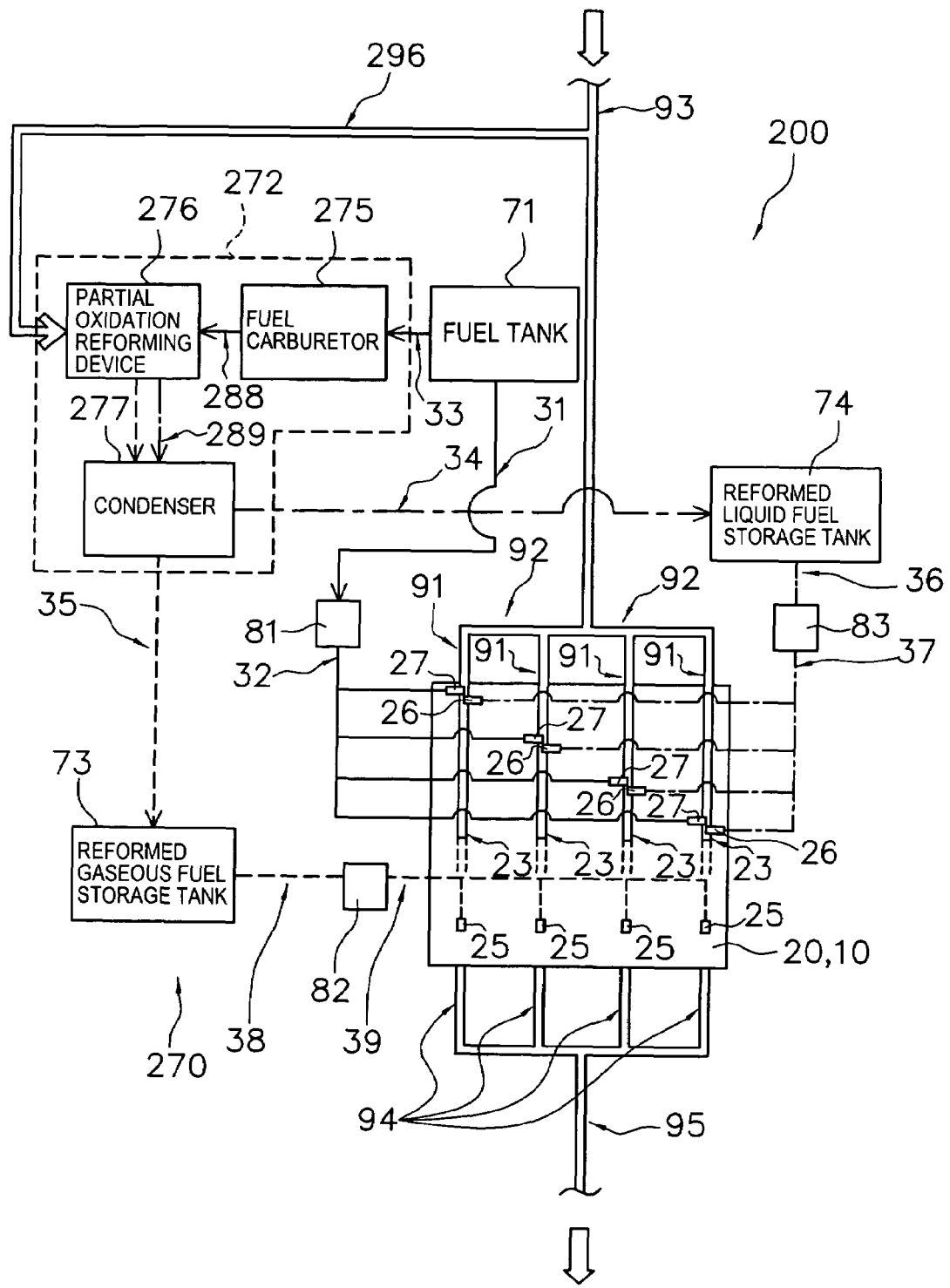
FIG. 6 is a schematic view of an internal combustion engine with auxiliary combustion chamber illustrating a fuel supplying mechanism in accordance with a third embodiment of the present invention.

Referring now to FIG. 6, an internal combustion engine 200 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The internal combustion engine 200 of this embodiment is basically the same as the internal combustion engine 1 of the first embodiment, except that a fuel supplying mechanism 270 is used in the third embodiment instead of the fuel supplying mechanism 70 of the first embodiment. Moreover, in the internal combustion engine 200 of the third embodiment, a second air intake pipe 296 is provided. The fuel supplying mechanism 270 of the third embodiment differs from the fuel supplying mechanism 70 of the first embodiment in that the fuel supplying mechanism includes a partial oxidation reforming system (fuel reforming unit) 272 instead of the liquid phase plasma reforming device 72 of the first embodiment. Accordingly, the structure of the internal combustion engine 200 of the third embodiment is basically identical to the structure of the internal combustion engine 1 illustrated in FIG. 1, except that the liquid phase plasma reforming device 72 in FIG. 1 is substituted with the partial oxidation reforming system 272 in the third embodiment.

FIG. 6 is a schematic view of the internal combustion engine 200 illustrating the fuel supplying mechanism 270 in accordance with the third embodiment of the present invention. The partial oxidation reforming system 272 basically comprises a fuel carburetor 275, a partial oxidation reforming device (partial oxidation reforming section) 276, a condenser (condensing section) 277, an eleventh fuel pipe 288, and a twelfth fuel pipe 289. The second air intake pipe 296 branches from the first air intake pipe 93 and connects to the partial oxidation reforming device 276 as seen in FIG. 6.

The fuel tank 71 is connected to the fuel carburetor 275 by the third fuel pipe 33, and the fuel carburetor 275 is connected to the partial oxidation reforming device 276 by the eleventh fuel pipe 288. The partial oxidation reforming device 276 is connected to the condenser 277 by the twelfth fuel pipe 289 and, thus, the condenser 277 is arranged downstream of the partial oxidation reforming device 276. The condenser 277 is connected to the reformed liquid fuel storage tank 74 by the fourth fuel pipe 34 and to the reformed gaseous fuel storage tank 73 by the fifth fuel pipe 35.

A portion of the fuel stored in the fuel tank 71 is supplied to the fuel carburetor 275 through the third fuel pipe 33. The fuel carburetor 275 is configured and arranged to vaporize the fuel. The vaporized fuel is supplied to the partial oxidation reforming device 276 through the eleventh fuel pipe 288. Fresh air from the first air intake pipe 93 is supplied to the partial oxidation reforming device 276 through the second air intake pipe 296. In the partial oxidation reforming device 276, the fresh air and the vaporized fuel undergo a partial oxidation reforming reaction with each other in the presence of a catalyst and thereby produce a first gas and a reformed gaseous fuel. The first gas is a reformed liquid fuel in a gaseous form. The reformed liquid fuel has a higher octane value than the unreformed fuel prior to the reformation in the partial oxidation reforming system 272, and thus, has an improved knock resistance. The reformed gaseous fuel contains hydrogen as a main component, and thus, has an improved combustibility. In FIG. 6, the flow of the unreformed fuel is indicated with a solid line.

The first gas and the reformed gaseous fuel produced by the partial oxidation reforming device 276 are supplied to the condenser 277 through the twelfth fuel pipe 289. The condenser 277 condenses the first gas, thereby changing the first gas into the reformed liquid fuel and separating the reformed liquid fuel from the reformed gaseous fuel. After being separated in the condenser 277, the reformed gaseous fuel is supplied to the reformed gaseous fuel storage tank 73 through the fifth fuel pipe 35. Meanwhile, the reformed liquid fuel is supplied to the reformed liquid fuel storage tank 74 through the fourth fuel pipe 34. In FIG. 6, the flow of the reformed gaseous fuel is indicated with a broken (dotted) line and the flow of the reformed liquid fuel is indicated with a single-dotted chain line.

The fuel injection control executed in the ECU 40 (FIG. 1) in the internal combustion engine 200 of the third embodiment is basically identical to the fuel injection control executed in the internal combustion engine 1 of the first embodiment as explained above. More specifically, the ECU 40 is configured to control the fuel supplying mechanism 270 such that the reformed gaseous fuel is supplied to the auxiliary combustion chamber 61 (FIG. 1) when the first operating condition exists (i.e., when the internal combustion engine 200 is operating in the first control region A1 in FIGS. 3 and 4) and the reformed liquid fuel is supplied to the main combustion chamber 63 (FIG. 1) when a second operating condition exists (i.e., when the internal combustion engine 200 is operating in the second control region A2 in FIGS. 3 and 4).

Thus, similarly to the first embodiment, a suitable combustion speed can be achieved in the auxiliary combustion chamber 61 and a suitable ignitability can be achieved in the main combustion chamber 63 during various operating conditions. As a result, with the internal combustion engine 200 of the third embodiment, too, appropriate combustion states can be achieved in both the auxiliary combustion chamber 61 and the main combustion chamber 63 during various operating conditions.

Additionally, in the internal combustion engine 200 of the third embodiment, the partial oxidation reforming device 276 of the partial oxidation reforming system 272 is configured and arranged to reform the fuel by causing the fuel and the fresh air to undergo a partial oxidation reforming reaction that produces the first gas and the reformed gaseous fuel. The condenser 277 is then configured and arranged to condense the first gas to convert the first gas into a reformed liquid fuel. Consequently, the partial oxidation reforming system 272 used to reform the fuel has a high degree of reliability.

Fourth Embodiment

Figure 7:
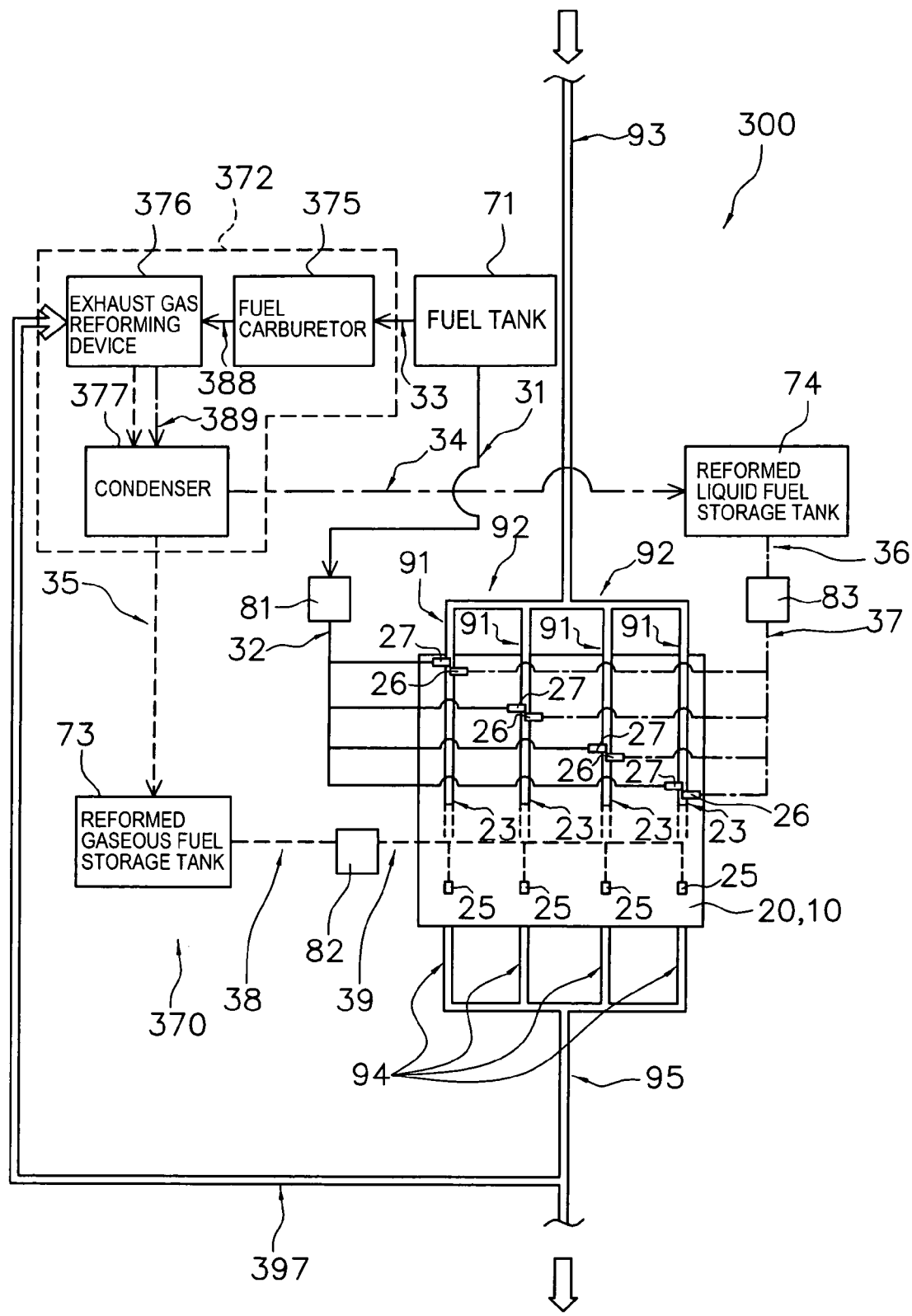
FIG. 7 is a schematic view of an internal combustion engine with auxiliary combustion chamber illustrating a fuel supplying mechanism in accordance with a fourth embodiment of the present invention.

Referring now to FIG. 7, an internal combustion engine 300 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The internal combustion engine 300 of the fourth embodiment is basically the same as the internal combustion engine 1 of the first embodiment, except that a fuel supplying mechanism 370 is used in the fourth embodiment instead of the fuel supplying mechanism 70 of the first embodiment. Moreover, a second exhaust pipe 397 is provided in the internal combustion engine 300 of the fourth embodiment. The fuel supplying mechanism 370 includes an exhaust gas reforming system (fuel reforming unit) 372 instead of the liquid phase plasma reforming device 72 of the first embodiment. Accordingly, the structure of the internal combustion engine 300 of the fourth embodiment is basically identical to the structure of the internal combustion engine 1 illustrated in FIG. 1, except that the liquid phase plasma reforming device 72 in FIG. 1 is substituted with the exhaust gas reforming system 372 in the fourth embodiment.

FIG. 7 is a schematic view of the internal combustion engine 300 illustrating the fuel supplying mechanism 370 in accordance with the fourth embodiment of the present invention. The exhaust gas reforming system 372 basically comprises a fuel carburetor 375, an exhaust gas reforming device (exhaust gas reforming section) 376, a condenser (condensing section) 377, an eleventh fuel pipe 388, and a twelfth fuel pipe 389. Moreover, the second exhaust pipe 397 branches from the first exhaust pipe 95 and connects to the exhaust gas reforming device 376.

The fuel tank 71 is connected to the fuel carburetor 375 by the third fuel pipe 33, and the fuel carburetor 375 is connected to the exhaust gas reforming device 376 by the eleventh fuel pipe 388. The exhaust gas reforming device 376 is connected to the condenser 377 by the twelfth fuel pipe 389, and thus, the condenser 377 is arranged downstream of the exhaust gas reforming device 376. The condenser 377 is connected to the reformed liquid fuel storage tank 74 by the fourth fuel pipe 34 and to the reformed gaseous fuel storage tank 73 by the fifth fuel pipe 35.

A portion of the fuel stored in the fuel tank 71 is supplied to the fuel carburetor 375 through the third fuel pipe 33. The fuel carburetor 375 is configured and arranged to vaporize the fuel. The vaporized fuel is supplied to the exhaust gas reforming device 376 through the eleventh fuel pipe 388. Exhaust gas from the first exhaust pipe 95 is supplied to the exhaust gas reforming device 376 through the second exhaust pipe 397. In the exhaust gas reforming device 376, the exhaust gas and the vaporized fuel undergo an exhaust gas reforming reaction with each other in the presence of a catalyst and thereby produce a first gas and a reformed gaseous fuel. The first gas is a reformed liquid fuel in a gaseous form. The reformed liquid fuel has a higher octane value than the unreformed fuel prior to the reformation in the exhaust gas reforming system 372, and thus, has an improved knock resistance. The reformed gaseous fuel contains hydrogen as a main component, and thus, has a reformed combustibility. In FIG. 7, the flow of the unreformed fuel is indicated with a solid line.

The first gas and the reformed gaseous fuel produced by the exhaust gas reforming device 376 are supplied to the condenser 377 through the twelfth fuel pipe 389. The condenser 377 is configured and arranged to condense the first gas, thereby changing the first gas into the reformed liquid fuel and separating the reformed liquid fuel from the reformed gaseous fuel. After being separated in the condenser 377, the reformed gaseous fuel is supplied to the reformed gaseous fuel storage tank 73 through the fifth fuel pipe 35. On the other hand, the reformed liquid fuel is supplied to the reformed liquid fuel storage tank 74 through the fourth fuel pipe 34. In FIG. 7, the flow of the reformed gaseous fuel is indicated with a broken (dotted) line and the flow of the reformed liquid fuel is indicated with a single-dotted chain line.

The fuel injection control executed in the ECU 40 (FIG. 1) in the internal combustion engine 300 of the fourth embodiment is basically identical to the fuel injection control executed in the internal combustion engine 1 of the first embodiment as explained above. More specifically, the ECU 40 is configured to control the fuel supplying mechanism 370 such that the reformed gaseous fuel is supplied to the auxiliary combustion chamber 61 (FIG. 1) when the first operating condition exists (i.e., when the internal combustion engine 300 is operating in the first control region A1 in FIGS. 3 and 4) and the reformed liquid fuel is supplied to the main combustion chamber 63 (FIG. 1) when a second operating condition exists (i.e., when the internal combustion engine 300 is operating in the second control region A2 in FIGS. 3 and 4).

Thus, similarly to the first embodiment, in the fourth embodiment of the present invention, a suitable combustion speed can be achieved in the auxiliary combustion chamber 61 and a suitable ignitability can be achieved in the main combustion chamber 63 during various operating conditions. As a result, with the internal combustion engine 300 of the fourth embodiment, too, appropriate combustion states can be achieved in both the auxiliary combustion chamber 61 and the main combustion chamber 63 during various operating conditions.

Additionally, in the fourth embodiment, the exhaust gas reforming device 376 of the exhaust gas reforming system 372 is configured and arranged to reform the fuel by causing the fuel and exhaust gas to undergo an exhaust gas reforming reaction that produces a first gas and a reformed gaseous fuel. The condenser 377 is then configured to condense the first gas to convert the first gas into a reformed liquid fuel. As a result, the thermal energy of the exhaust gas is used in an efficient manner.

Fifth Embodiment

Figure 8:
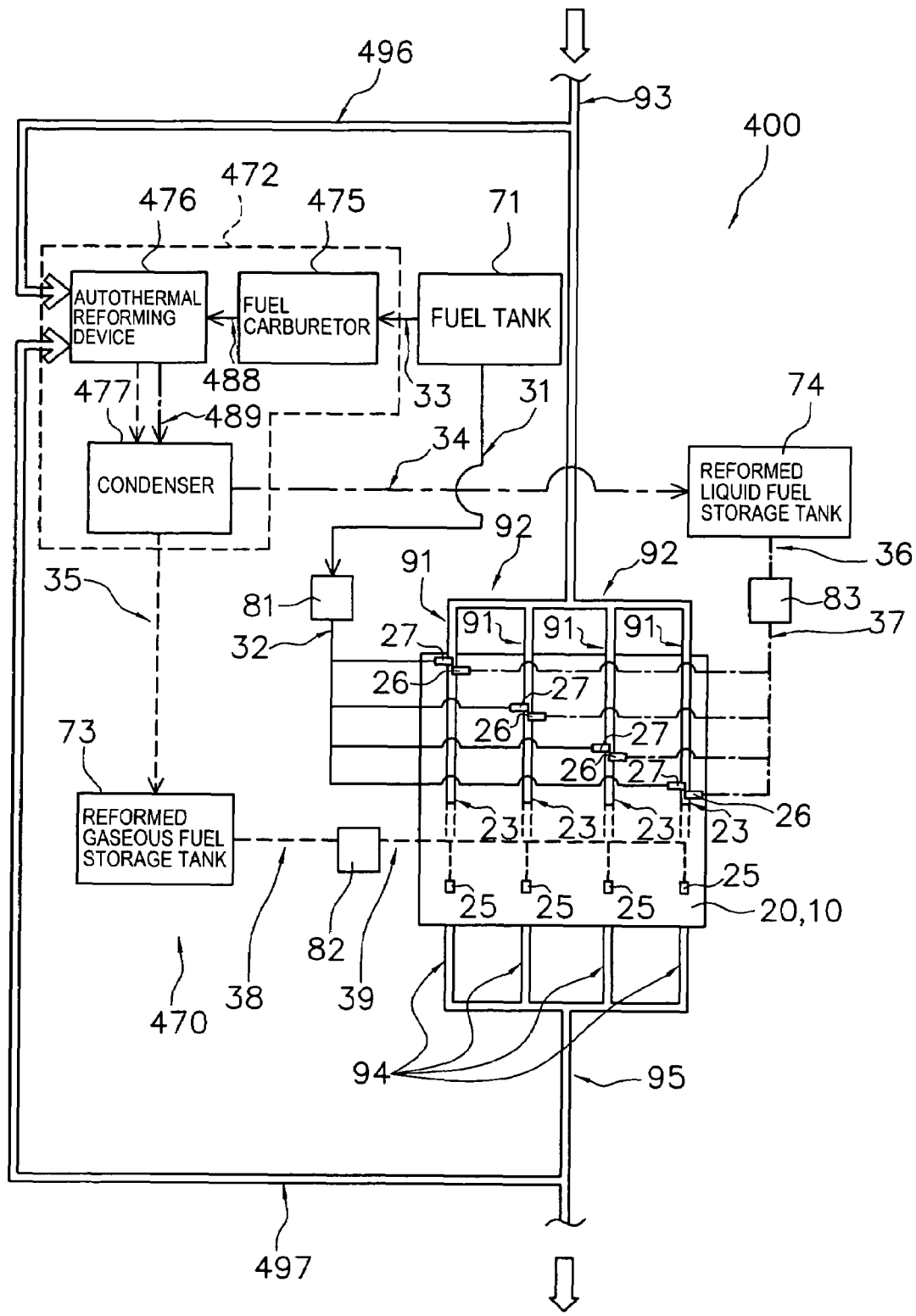
FIG. 8 is a schematic view of an internal combustion engine with auxiliary combustion chamber illustrating a fuel supplying mechanism in accordance with a fifth embodiment of the present invention.

Referring now to FIG. 8, an internal combustion engine 400 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The internal combustion engine 400 of the fifth embodiment is basically the same as the internal combustion engine 1 of the first embodiment, except that a fuel supplying mechanism 470 is used in the fifth embodiment instead of the fuel supplying mechanism 70 of the first embodiment. Moreover, the internal combustion engine 400 of the fifth embodiment is provided with a second air intake pipe 496 and a second exhaust pipe 497 as seen in FIG. 8. The fuel supplying mechanism 470 of the fifth embodiment differs from the fuel supplying mechanism 70 of the first embodiment in that the fuel supplying mechanism 470 of the fifth embodiment includes an autothermal reforming system (fuel reforming unit) 472 instead of the liquid phase plasma reforming device 72 of the first embodiment. Accordingly, the structure of the internal combustion engine 400 of the fifth embodiment is basically identical to the structure of the internal combustion engine 1 illustrated in FIG. 1, except that the liquid phase plasma reforming device 72 in FIG. 1 is substituted with the autothermal reforming system 472 in the fifth embodiment.

FIG. 8 is a schematic view of the internal combustion engine 400 illustrating the fuel supplying mechanism 470 in accordance with the fifth embodiment of the present invention. The autothermal reforming system 472 basically comprises a fuel carburetor 475, an autothermal reforming device (autothermal reforming section) 476, a condenser (condensing section) 477, an eleventh fuel pipe 488, and a twelfth fuel pipe 489. Moreover, in the internal combustion engine 400 of the fifth embodiment, the second air intake pipe 496 branches from the first air intake pipe 93 and connects to the autothermal reforming device 476 and the second exhaust pipe 497 branches from the first exhaust pipe 95 and connects to the autothermal reforming device 476.

The fuel tank 71 is connected to the fuel carburetor 475 by the third fuel pipe 33, and the fuel carburetor 475 is connected to the autothermal reforming device 476 by the eleventh fuel pipe 488. The autothermal reforming device 476 is connected to the condenser 477 by the twelfth fuel pipe 489, and thus, the condenser 477 is arranged downstream of the autothermal reforming device 476. The condenser 477 is connected to the reformed liquid fuel storage tank 74 by the fourth fuel pipe 34 and to the reformed gaseous fuel storage tank 73 by the fifth fuel pipe 35.

A portion of the fuel stored in the fuel tank 71 is supplied to the fuel carburetor 475 through the third fuel pipe 33. The fuel carburetor 475 is configured and arranged to vaporize the fuel. The vaporized fuel is supplied to the autothermal reforming device 476 through the eleventh fuel pipe 488. Meanwhile, fresh air from the first air intake pipe 93 is supplied to the autothermal reforming device 476 through the second air intake pipe 496 and exhaust gas from the first exhaust pipe 95 is supplied to the autothermal reforming device 476 through the second exhaust pipe 497. In the autothermal reforming device 476, the vaporized fuel, the exhaust gas, and the fresh air undergo an autothermal reforming reaction in the presence of a catalyst and thereby produce a first gas and a reformed gaseous fuel. The first gas is a reformed liquid fuel in a gaseous form. The reformed liquid fuel has a higher octane value than the original unreformed fuel, and thus, has an improved knock resistance. The reformed gaseous fuel contains hydrogen as a main component, and thus, has an improved combustibility. In FIG. 8, the flow of the unreformed fuel is indicated with a solid line.

The first gas and the reformed gaseous fuel produced by the autothermal reforming device 476 are supplied to the condenser 477 through the twelfth fuel pipe 489. The condenser 477 is configured and arranged to condense the first gas, thereby changing the first gas into the reformed liquid fuel and separating the reformed liquid fuel from the reformed gaseous fuel. After being separated in the condenser 477, the reformed gaseous fuel is supplied to the reformed gaseous fuel storage tank 73 through the fifth fuel pipe 35. On the other hand, the reformed liquid fuel is supplied to the reformed liquid fuel storage tank 74 through the fourth fuel pipe 34. In FIG. 8, the flow of the reformed gaseous fuel is indicated with a broken (dotted) line and the flow of the reformed liquid fuel is indicated with a single-dotted chain line.

The fuel injection control executed in the ECU 40 (FIG. 1) in the internal combustion engine 400 of the fifth embodiment is basically identical to the fuel injection control executed in the internal combustion engine 1 of the first embodiment as explained above. More specifically, the ECU 40 is configured to control the fuel supplying mechanism 470 such that the reformed gaseous fuel is supplied to the auxiliary combustion chamber 61 (FIG. 1) when the first operating condition exists (i.e., when the internal combustion engine 400 is operating in the first control region A1 in FIGS. 3 and 4) and the reformed liquid fuel is supplied to the main combustion chamber 63 (FIG. 1) when a second operating condition exists (i.e., when the internal combustion engine 300 is operating in the second control region A2 in FIGS. 3 and 4).

Thus, similarly to the first embodiment, a suitable combustion speed can be achieved in the auxiliary combustion chamber 61 and a suitable ignitability can be achieved in the main combustion chamber 63 during various operating conditions. As a result, with the internal combustion engine 400 of the fifth embodiment, too, appropriate combustion states can be achieved in both the auxiliary combustion chamber 61 and the main combustion chamber 63 during various operating conditions.

Additionally, in the fifth embodiment, the autothermal reforming device 476 of the autothermal reforming system 472 is configured and arranged to reform the fuel by causing the fuel, the exhaust gas, and the fresh air to undergo an autothermal reforming reaction that produces the first gas and the reformed gaseous fuel. The condenser 477 then condenses the first gas to convert the first gas into the reformed liquid fuel. As a result, the thermal energy of the exhaust gas is used in an efficient fashion.

Accordingly, the internal combustion engines 1, 100, 200, 300 and 400 in accordance with the present invention can achieve appropriate combustion states in both the auxiliary combustion chamber 61 and the main combustion chamber 63 during various operating conditions. The present invention is therefore useful when applied to internal combustion engines equipped with auxiliary combustion chambers.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An internal combustion engine comprising:
a main combustion chamber;
an auxiliary combustion chamber that is communicated with the main combustion chamber;
a fuel supplying mechanism including a fuel reforming unit configured and arranged to reform a fuel to produce a reformed gaseous fuel and a reformed liquid fuel; and
a control unit configured to control the fuel supplying mechanism to selectively supply the reformed gaseous fuel to the auxiliary combustion chamber when a first operating condition of the internal combustion engine exists and to selectively supply the reformed liquid fuel to the main combustion chamber bypassing the auxiliary chamber when a second operating condition of the internal combustion engine exists that is different from the first operating condition.

2. The internal combustion engine recited in claim 1, wherein
the fuel supplying mechanism further includes a reformed gaseous fuel storage unit disposed downstream of the fuel reforming unit, and configured and arranged to store the reformed gaseous fuel produced by the fuel reforming unit.

3. The internal combustion engine recited in claim 1, wherein
the fuel supplying mechanism further includes a reformed liquid fuel storage unit disposed downstream of the fuel reforming unit, and configured and arranged to store the reformed liquid fuel produced by the fuel reforming unit.

4. The internal combustion engine recited in claim 3, wherein
the fuel supplying mechanism further includes
a fuel storage unit configured and arranged to store the fuel,
a reformed liquid fuel supplying unit configured and arranged to selectively supply the reformed liquid fuel stored in the reformed liquid fuel storage unit to the main combustion chamber, and
a fuel supplying unit configured and arranged to selectively supply the fuel stored in the fuel storage unit to the main combustion chamber.

5. The internal combustion engine recited in claim 4, wherein
the control unit is configured to control the reformed liquid fuel supplying unit and the fuel supplying unit of the fuel supplying mechanism to switch between a first injection control state in which the reformed liquid fuel supplying unit supplies reformed liquid fuel to the main combustion chamber and a second injection control state in which the fuel supplying unit supplies the fuel to the main combustion chamber.

6. The internal combustion engine recited in claim 1, wherein
the fuel reforming unit is configured to reform the fuel by creating a plasma discharge in the fuel.

7. The internal combustion engine recited in claim 1, wherein
the fuel reforming unit is configured to reform the fuel by shining laser light into the fuel.

8. The internal combustion engine recited in claim 1, wherein
the fuel reforming unit further includes
a partial oxidation reforming section configured and arranged to execute a partial oxidation reforming reaction between the fuel and fresh air to produce the reformed gaseous fuel and a first gas composed of the reformed liquid fuel in gaseous form, and
a condensing section disposed downstream of the partial oxidation reforming section, and configured and arranged to condense the first gas to change the first gas into the reformed liquid fuel.

9. The internal combustion engine recited in claim 1, wherein
the fuel reforming unit further includes
an exhaust gas reforming section configured and arranged to execute an exhaust gas reforming reaction between the fuel and exhaust gas to produce the reformed gaseous fuel and a first gas composed of the reformed liquid fuel in gaseous form; and a condensing section arranged downstream of the exhaust gas reforming section, and configured and arranged to condense the first gas to change the first gas into the reformed liquid fuel.

10. The internal combustion engine recited in claim 1, wherein
the fuel reforming unit further includes
an autothermal reforming section configured and arranged to execute an autothermal reforming reaction between the fuel, exhaust gas, and fresh air to produce the reformed gaseous fuel and a first gas composed of the reformed liquid fuel in gaseous form; and
a condensing section arranged downstream of the autothermal reforming section, and configured and arranged to condense the first gas to change the first gas into the reformed liquid fuel.

11. An internal combustion engine comprising:
a main combustion chamber;
an auxiliary combustion chamber that is communicated with the main combustion chamber;
a fuel supplying mechanism including a fuel reforming unit configured and arranged to reform a fuel to produce a reformed gaseous fuel and a reformed liquid fuel, the fuel reforming unit further configured and arranged to produce the reformed gaseous fuel that contains hydrogen as a main component; and
a control unit configured to control the fuel supplying mechanism to selectively supply the reformed gaseous fuel to the auxiliary combustion chamber when a first operating condition exists and to selectively supply the reformed liquid fuel to the main combustion chamber when a second operating condition exists, the control unit being further configured to determine that the first operating condition exists when the internal combustion engine is operating in a low-load and low-speed engine operating region.

12. The internal combustion engine recited in claim 11, wherein
the control unit is configured to control the fuel supplying mechanism such that the smaller an engine load is, the larger an amount of the reformed gaseous fuel supplied to the auxiliary combustion chamber becomes when the first operating condition exists.

13. The internal combustion engine recited in claim 12, wherein
the control unit is configured to determine that the second operating condition exists when the internal combustion engine is operating in a high-load and low-speed engine operating region; and
the fuel reforming unit is configured and arranged to produce the reformed liquid fuel that has a higher octane value than the fuel prior to the reformation.

14. The internal combustion engine recited in claim 13, wherein
the control unit is configured to control the fuel supplying mechanism such that the lower an engine speed is, the larger an amount of the reformed liquid fuel supplied to the main combustion chamber becomes when the second operating condition exists.

15. The internal combustion engine recited in claim 13, wherein
the control unit is configured to control the fuel supplying mechanism such that the higher the engine load is, the larger an amount of the reformed liquid fuel supplied to the main combustion chamber becomes when the second operating condition exists.

16. An internal combustion engine comprising:
a main combustion chamber;
an auxiliary combustion chamber that is communicated with the main combustion chamber;
a fuel supplying mechanism including a fuel reforming unit configured and arranged to reform a fuel to produce a reformed gaseous fuel and a reformed liquid fuel, the fuel reforming unit further configured and arranged to produce the reformed liquid fuel that has a higher octane value than the fuel prior to the reformation; and
a control unit configured to control the fuel supplying mechanism to selectively supply the reformed gaseous fuel to the auxiliary combustion chamber when a first operating condition exists and to selectively supply the reformed liquid fuel to the main combustion chamber when a second operating condition exists, the control unit being further configured to determine that the second operating condition exists when the internal combustion engine is operating in a high-load and low-speed engine operating region.

17. The internal combustion engine recited in claim 16, wherein
the control unit is configured to control the fuel supplying mechanism such that the lower an engine speed is, the larger an amount of the reformed liquid fuel supplied to the main combustion chamber becomes when the second operating condition exists.

18. The internal combustion engine recited in claim 16, wherein
the control unit is configured to control the fuel supplying mechanism such that the higher an engine load is, the larger an amount of the reformed liquid fuel supplied to the main combustion chamber becomes when the second operating condition exists.

19. An internal combustion engine comprising:
means for forming a main combustion chamber and an auxiliary combustion chamber that is communicated with the main combustion chamber;
fuel reforming means for reforming a fuel to produce a reformed gaseous fuel and a reformed liquid fuel; and
control means for selectively supplying the reformed gaseous fuel to the auxiliary combustion chamber when a first operating condition of the internal combustion engine exists, and for selectively supplying the reformed liquid fuel to the main combustion chamber bypassing the auxiliary chamber when a second operating condition of the internal combustion engine exists that is different from the first operating condition.

20. A method of controlling an internal combustion engine comprising:
providing a main combustion chamber and an auxiliary combustion chamber that is communicated with the main combustion chamber;
reforming a fuel to produce a reformed gaseous fuel and a reformed liquid fuel;
selectively supplying the reformed gaseous fuel to the auxiliary combustion chamber when a first operating condition of the internal combustion engine exists; and
selectively supplying the reformed liquid fuel to the main combustion chamber bypassing the auxiliary chamber when a second operating condition of the internal combustion engine exists that is different from the first operating condition.

* * * * *